(12) United States Patent
Yoshimitsu et al.

(10) Patent No.: US 12,731,803 B2
(45) Date of Patent: Sep. 8, 2026

(54) METHOD FOR MANUFACTURING MEMBRANE ELECTRODE ASSEMBLY

(71) Applicant: DENSO CORPORATION, Kariya-city (JP)

(72) Inventors: Yuuya Yoshimitsu, Kariya-city (JP); Nobuyoshi Sakakibara, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 741 days.

(21) Appl. No.: 18/174,753

(22) Filed: Feb. 27, 2023

(65) Prior Publication Data

US 2023/0282859 A1 Sep. 7, 2023

(30) Foreign Application Priority Data

Mar. 1, 2022 (JP) ................................ 2022-031177

(51) Int. Cl.
*H01M 8/1004* (2016.01)
*H01M 8/103* (2016.01)

(52) U.S. Cl.
CPC ......... *H01M 8/1004* (2013.01); *H01M 8/103* (2013.01)

(58) Field of Classification Search
CPC .. H01M 8/1004; H01M 8/103; H01M 8/1048; H01M 8/1032; H01M 2008/1095; Y02E 60/50; Y02P 70/50
See application file for complete search history.

(56) References Cited

U.S. PATENT DOCUMENTS

| | | | | |
|---|---|---|---|---|
| RE41,651 | E | 9/2010 | Kosako et al. | |
| 2003/0158273 | A1* | 8/2003 | Kosako | H01M 4/8652 429/510 |
| 2010/0151298 | A1* | 6/2010 | Hong | H01M 4/921 429/493 |
| 2021/0226223 | A1* | 7/2021 | Morioka | H01M 8/04149 |

* cited by examiner

*Primary Examiner* — Daniel S Gatewood
(74) *Attorney, Agent, or Firm* — Posz Law Group, PLC

(57) ABSTRACT

In a method for manufacturing a membrane electrode assembly, a catalyst layer is bonded to a catalyst layer support made of a sublimation material by placing the catalyst layer support into contact with the catalyst layer. In the method, an electrolyte membrane is bonded to the catalyst layer by placing the electrolyte membrane into contact with the catalyst layer bonded to the catalyst layer support. In the method, the catalyst layer support is sublimated in a state where the electrolyte membrane is bonded to the catalyst layer.

5 Claims, 3 Drawing Sheets

(1)
14
100
(2)
102
101
(3)
100
14
102
101
(4)
100
14
102
101
(5)
14b
14
102
(6)
102
14
11
103
(7)
14
11
103

METHOD FOR MANUFACTURING MEMBRANE ELECTRODE ASSEMBLY

CROSS REFERENCE TO RELATED APPLICATION

This application is based on and claims the benefits of priority of Japanese Patent Application No. 2022-031177 filed on Mar. 1, 2022. The entire disclosure of which is incorporated herein by reference.

TECHNICAL FIELD

The present disclosure relates to a method for manufacturing a membrane electrode assembly.

BACKGROUND

A membrane electrode assembly (MEA) used in a fuel cell is manufactured by bonding an electrode layer to an electrolyte membrane.

SUMMARY

According to at least one embodiment, a method for manufacturing a membrane electrode assembly is disclosed. The membrane electrode assembly includes a pair of electrodes and an electrolyte membrane interposed between the pair of electrodes. Each of the pair of electrodes includes a catalyst layer bonded to the electrolyte membrane, and a gas diffusion layer bonded to the catalyst layer. In the method, the catalyst layer is bonded to a catalyst layer support made of a sublimation material by placing the catalyst layer support into contact with the catalyst layer. In the method, the electrolyte membrane is bonded to the catalyst layer by placing the electrolyte membrane into contact with the catalyst layer bonded to the catalyst layer support. In the method, the catalyst layer support is sublimated in a state where the electrolyte membrane is bonded to the catalyst layer.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
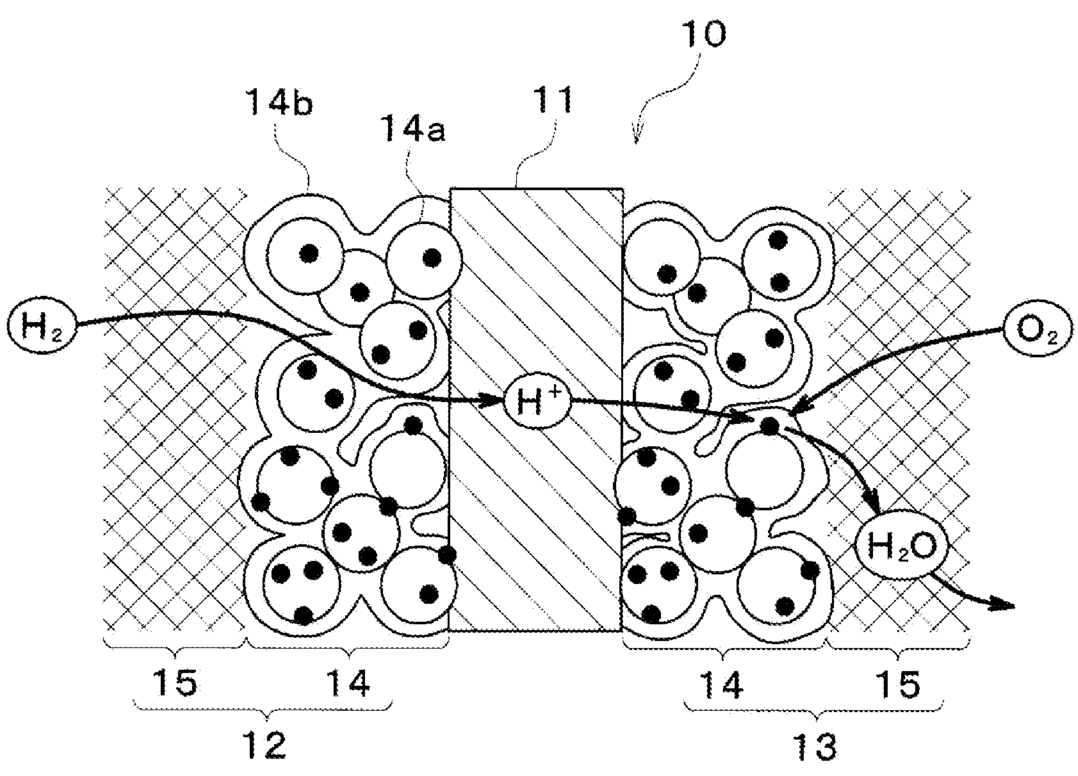
FIG. 1 is a schematic diagram illustrating a membrane electrode assembly according to an embodiment of the present disclosure.

To begin with, examples of relevant techniques will be described. A membrane electrode assembly (MEA) used in a fuel cell is manufactured by bonding an electrode layer consisting of a catalyst layer and a gas diffusion layer to an electrolyte membrane.

A method according to a comparative example for manufacturing the membrane electrode assembly is disclosed as a method for forming the catalyst layer and the gas diffusion layer on the electrolyte membrane and then pressing from an outside of the gas diffusion layer.

However, the method of the comparative example using the pressing process is difficult to ensure a flatness of the catalyst layer due to an uneven shape having the gas diffusion layer made of carbon paper. Furthermore, the press process may damage the catalyst layer and the electrolyte membrane. Thus, when the electrolyte membrane is thin, cross-leakage is likely to occur.

In addition, if an ionomer is added after the catalyst layer is first applied to the gas diffusion layer, the ionomer may permeate the gas diffusion layer, thereby degrading a gas diffusion performance of the gas diffusion layer. Further, controlling a content of the ionomer in the catalyst layer to be an optimum content may be difficult.

In contrast to the comparative example, according to a method of the present disclosure for manufacturing a membrane electrode assembly, a quality of the membrane electrode assembly can be improved.

According to one aspect of the present disclosure, a method for manufacturing a membrane electrode assembly is disclosed. The membrane electrode assembly includes a pair of electrodes and an electrolyte membrane interposed between the pair of electrodes. Each of the pair of electrodes includes a catalyst layer bonded to the electrolyte membrane, and a gas diffusion layer bonded to the catalyst layer. In the method, the catalyst layer is bonded to a catalyst layer support made of a sublimation material by placing the catalyst layer support into contact with the catalyst layer. In the method, the electrolyte membrane is bonded to the catalyst layer by placing the electrolyte membrane into contact with the catalyst layer bonded to the catalyst layer support. In the method, the catalyst layer support is sublimated in a state where the electrolyte membrane is bonded to the catalyst layer.

According to the present disclosure, since the catalyst layer is formed from the catalyst layer support made of the sublimation material, an independent monolayer catalyst layer can be obtained. As a result, the catalyst layer can be applied to the electrolyte membrane without performing a pressing step, and the membrane electrode assembly can be manufactured that does not depend on a shape of the gas diffusion layer. Thus, a flatness of the catalyst layer can be improved, the electrolyte membrane can be prevented from being damaged, and quality of the membrane electrode assembly can be improved.

Hereinafter, embodiments of the present disclosure will be described with reference to the drawings. A membrane electrode assembly 10 of the present embodiment is a membrane electrode assembly (MEA) for fuel cells, and is particularly used for phosphoric acid fuel cells using phosphoric acid as an electrolyte.

As shown in FIG. 1, the membrane electrode assembly 10 includes a pair of electrodes 12, 13 and an electrolyte membrane 11 interposed between the pair of electrodes 12, 13. The pair of electrodes 12, 13 includes an anode electrode 12 and a cathode electrode 13. The anode electrode 12 is also referred to as a hydrogen electrode and the cathode electrode 13 is also referred to as an air electrode.

The membrane electrode assembly 10 forms a fuel cell which outputs electric energy using an electrochemical reaction between hydrogen and oxygen contained in air. The fuel cell formed of the membrane electrode assembly 10 is provided as a basic unit, and multiple fuel cells can be stacked as a stack structure to be used.

When the anode electrode 12 is supplied with hydrogen as a fuel gas and the cathode electrode 13 is supplied with air as an oxidant gas, hydrogen and oxygen electrochemically react with each other to output electric energy as described below.

$$H_2 \rightarrow 2H^+ + 2e^- \quad \text{(Anode electrode side)}$$

$$2H^+ + \tfrac{1}{2}O_2 + 2e^- \rightarrow H_2O \quad \text{(Cathode electrode side)}$$

In this case, in the anode electrode 12, hydrogen is ionized into electron ($e^-$) and proton ($H^+$) by the catalytic reaction, and the proton moves through the electrolyte membrane 11. On the other hand, in the cathode electrode 13, water ($H_2O$) is generated from the protons transferring from the anode electrode 12 by the catalytic reaction, electrons flowing from the outside, and oxygen ($O_2$) contained in the air.

In the membrane electrode assembly 10 of the present embodiment, power is generated without humidifying the electrolyte membrane 11.

That is, during operation of the membrane electrode assembly 10, dry air is supplied to the cathode electrode 13. Therefore, the membrane electrode assembly 10 can generate power at a temperature equal to or higher than 100° C.

The electrolyte membrane 11 has a structure in which an electrolyte holding material is impregnated with phosphoric acid. In the present embodiment, polybenzimidazole (PBI) doped with the phosphoric acid is used as the electrolyte membrane 11. The phosphoric acid is a proton conductor.

The anode electrode 12 and the cathode electrode 13 have the same configuration. The anode electrode 12 and the cathode electrode 13 include a catalyst layer 14 and a gas diffusion layer 15. The catalyst layer 14 is disposed in contact with a surface of the electrolyte membrane 11. The gas diffusion layer 15 is disposed on an outer side of the catalyst layer 14 opposite to the electrolyte membrane 11. The catalyst layer 14 is bonded to the electrolyte membrane 11, and the gas diffusion layer 15 is bonded to the catalyst layer 14.

The catalyst layer 14 includes catalyst carrying carbons **14*a* and an ionomer 14*b* covering the catalyst carrying carbons 14*a*. The catalyst carrying carbons 14*a* include a carbon carrier and catalyst particles supported on the carbon carrier. In the present embodiment, Pt particles are used as the catalyst particles in the anode electrode, and PtCo particles are used as the catalyst particles in the cathode electrode. The ionomer 14*b*** is a proton conductor, and the phosphoric acid is used as the proton conductor in the present embodiment.

A porous material having conductivity is used for the gas diffusion layer 15. In the present embodiment, a porous carbon material such as carbon paper or carbon cloth is used as the gas diffusion layer 15.

Next, a method for manufacturing the membrane electrode assembly 10 of the present embodiment will be described. In the method for manufacturing the membrane electrode assembly 10 in the present embodiment, a sublimation material is used as a catalyst layer support 102 when applying the catalyst layer 14 to the electrolyte membrane 11. The sublimation material is a material that changes directly from a solid phase to a gas phase at room temperature through sublimation.

The sublimation material such as parasol (paradichlorobenzene), naphthalene, and camphor can be used. The parasol has a melting point of 53.5° C., the naphthalene has a melting point of 80.3° C., and the camphor has a melting point of 180° C. The sublimation material used as the catalyst layer support 102 may be selected in consideration of compatibility with the catalyst layer 14 and the electrolyte membrane 11, and the melting point, for example. In the present embodiment, the parasol, which has a low melting point and is easy to be handled, is used as the sublimation material.

Figure 2:
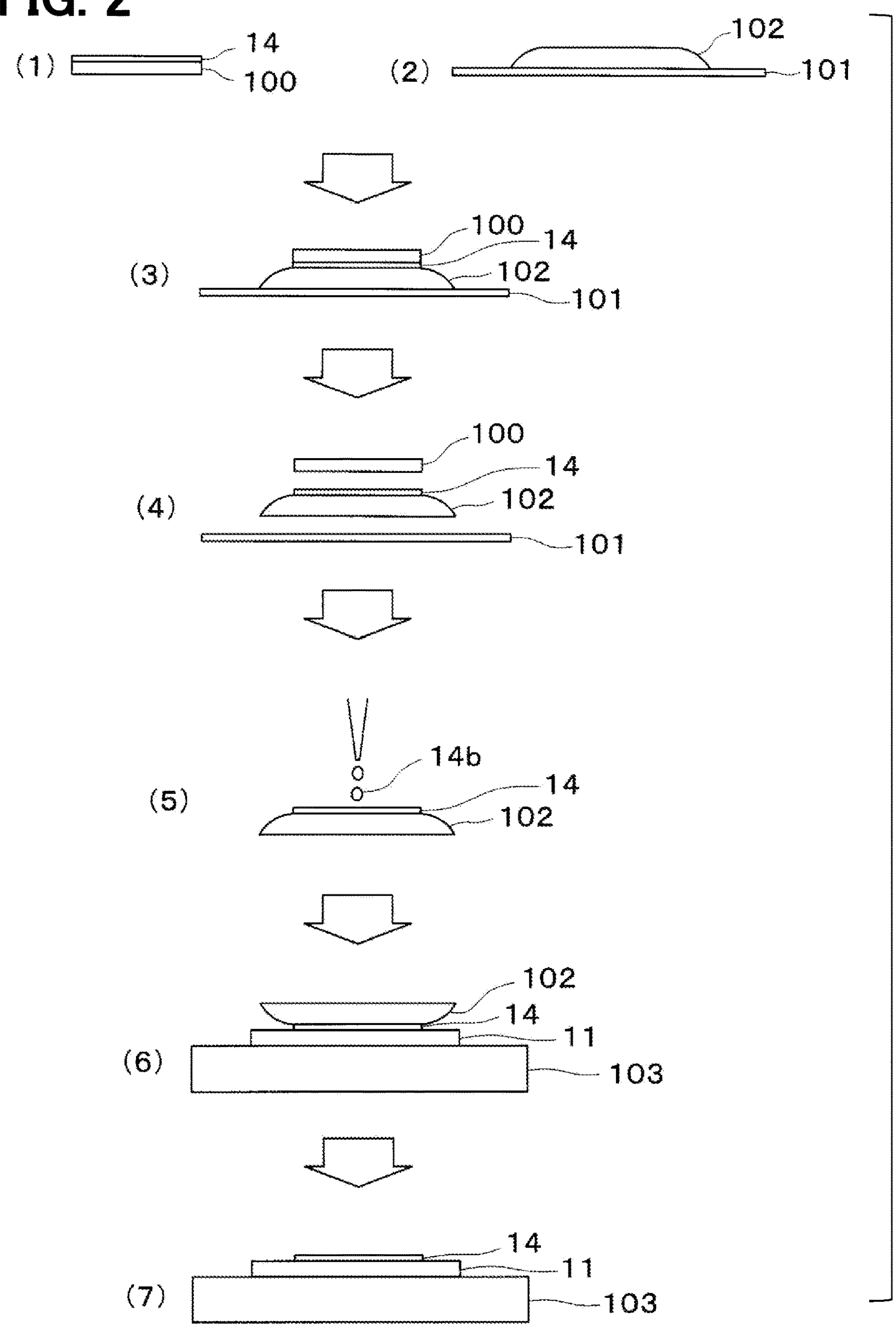
FIG. 2 is a diagram illustrating a manufacturing process of the membrane electrode assembly.

Hereinafter, the method for manufacturing the membrane electrode assembly 10 will be described referring to FIG. 2. In FIG. 2, the manufacturing process proceeds in order from (1) to (7).

First, in step (1), the catalyst layer 14 is prepared.

In step (1), the catalyst layer 14 is formed on a polyimide film 100 by spray coating the catalyst carrying carbon, and sintering treatment heating the catalyst layer 14 to 350° C. is performed in a reducing atmosphere for one hour.

By performing the sintering treatment, a binder contained in the catalyst layer 14 can be removed. The polyimide film 100 is a material with excellent smoothness and heat resistance, and is used as a base for the catalyst layer 14. A material different from the polyimide film 100 may be used for the base of the catalyst layer 14 as long as the material has excellent smoothness and heat resistance.

After that, the polyimide film 100 and the catalyst layer 14 are cut into 10 mm squares. Thus, a bonded body consisting of the catalyst layer 14 and the polyimide film 100 is obtained.

Next, in step (2), the catalyst layer support 102 is prepared.

In step (2), a parasol powder is sprinkled on a PET film 101 placed on a slide glass (not shown) and heated at 70° C. on a hot plate to melt the parasol powder. Thus, the catalyst layer support 102 is formed on the PET film 101. The PET film 101 is used as a material with excellent smoothness and release property.

Next, in step (3), the catalyst layer support 102 is in contact with the catalyst layer 14, and the catalyst layer support 102 is joined to the catalyst layer 14.

In step (3), the bonded body consisting of the catalyst layer 14 and the polyimide film 100 is placed on the catalyst layer support 102 that is in a molten state such that the catalyst layer 14 is in contact with the catalyst layer support 102. At this time, since the molten catalyst layer support 102 permeates into the catalyst layer 14, a degree of adhesion between the catalyst layer support 102 and the catalyst layer 14 can be improved, and a contact area between the catalyst layer support 102 and the catalyst layer 14 can be increased.

After confirming that the catalyst layer 14 has settled on the catalyst layer support 102 in the molten state, the heating by the hot plate is stopped, and the catalyst layer support 102 is gradually cooled. By slowly cooling the catalyst layer support 102, an adhesive strength of the catalyst layer 14 to the catalyst layer support 102 at the time of separating the polyimide film 100 from the catalyst layer 14 can be made to be higher than that in the case of rapid cooling of the catalyst layer support 102.

Next, in step (4), the polyimide film 100 and the PET film 101 are separated from a bonded body consisting of the catalyst layer 14 and the catalyst layer support 102.

In step (4), after slowly cooling the catalyst layer support 102, the polyimide film 100 is separated from the catalyst layer 14. The polyimide film 100 may be separated from corners using tweezers. Subsequently, the PET film 101 is separated from the catalyst layer support 102. As a result, the bonded body consisting of the catalyst layer 14 and the catalyst layer support 102 can be obtained, and an independent monolayer catalyst layer 14 can be obtained.

Next, in step (5), the ionomer **14*b* is added to the catalyst layer 14**.

In step (5), the ionomer **14*b* that is diluted with ethanol is dropped onto a surface of the catalyst layer 14 and then dried with the catalyst layer 14 facing upward. In the present embodiment, the phosphoric acid is used as the ionomer 14***b*. If the ionomer 14*b* is diluted with water, the ionomer 14*b* does not permeate into the catalyst layer 14 and is repelled by a surface of the catalyst layer 14. Thus, the ionomer 14*b* may be diluted with ethanol.

Next, in step (6), the catalyst layer 14 is placed in contact with the catalyst layer support 102, and then the bonded body consisting of the catalyst layer 14 and the catalyst layer support 102 is bonded to the electrolyte membrane 11.

In step (6), the electrolyte membrane 11 is attached to a slide glass 103, and the bonded body consisting of the catalyst layer 14 and the catalyst layer support 102 is placed on the electrolyte membrane 11 such that the catalyst layer 14 is between the catalyst layer support 102 and the electrolyte membrane 11. Thus, the catalyst layer 14 and the electrolyte membrane 11 are joined. In the present embodiment, polybenzimidazole doped with the phosphoric acid is used as the electrolyte membrane 11.

Next, in step (7), the catalyst layer support 102 is sublimated.

In step (7), the catalyst layer 14 and the electrolyte membrane 11 are left in a bonded state at room temperature for a whole day and night.

As a result, the catalyst layer support 102 made of the sublimation material sublimates and disappears, and the catalyst layer 14 can be applied to the electrolyte membrane 11.

Through the steps described above, creation of a bonded body in which the catalyst layer 14 is bonded to one surface of the electrolyte membrane 11 is completed. The catalyst layer 14 can also be bonded to the other surface of the electrolyte membrane 11 by performing the above-described steps. Then, manufacturing of the membrane electrode assembly 10 is completed by attaching the gas diffusion layer 15 to an outer side of each of catalyst layers 14 bonded to both surfaces of the electrolyte membrane 11.

Figure 3:
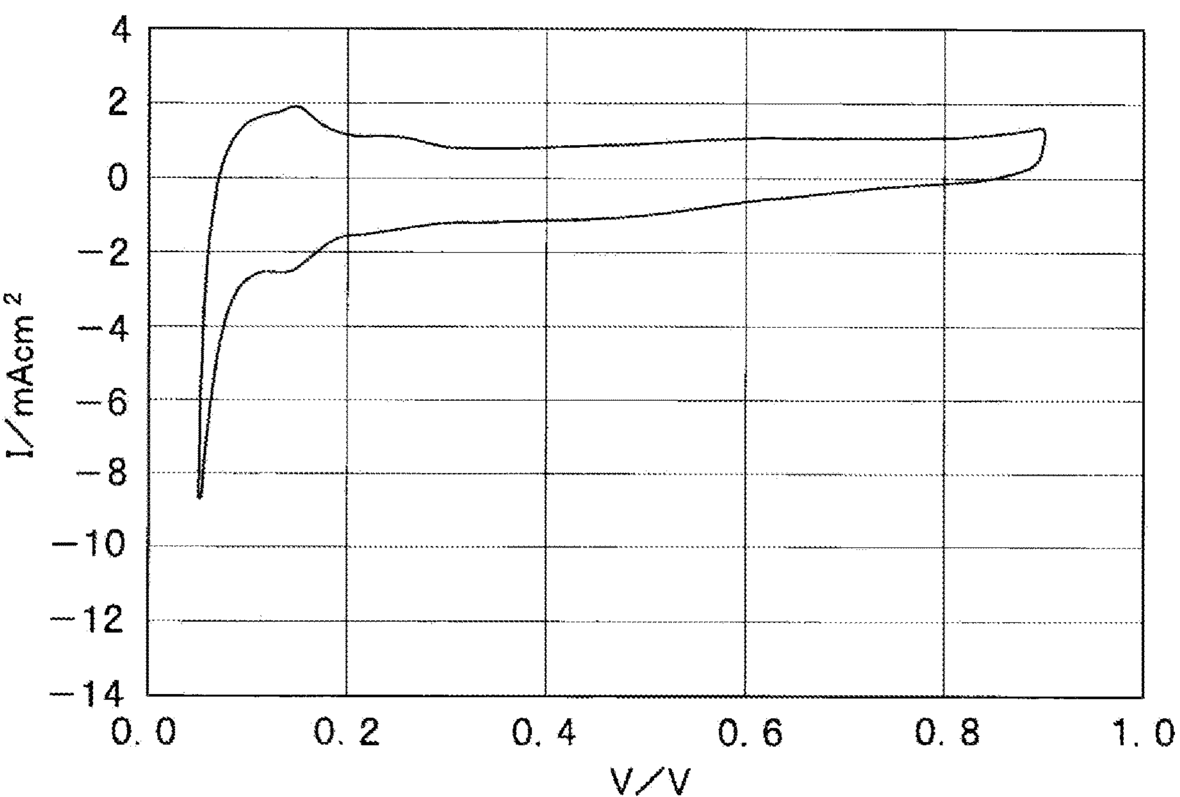
FIG. 3 is a graph illustrating a CV curve of the membrane electrode assembly.

Next, results of measuring the membrane electrode assembly 10 of the present embodiment by cyclic voltammetry (CV) will be described with reference to FIG. 3. FIG. 3 shows a CV curve of the membrane electrode assembly 10 of the present embodiment.

The membrane electrode assembly 10 of the present embodiment is manufactured without using a press process. In the membrane electrode assembly 10 of the present embodiment, 0.5 $\mu L/cm^2$ of the phosphoric acid is added as the ionomer.

As shown in FIG. 3, the CV curve of the present embodiment does not show an increase in current with an increase in voltage. Therefore, it was concluded that cross-leakage does not occur in the membrane electrode assembly 10 of the present embodiment. In addition, no significant effect is observed on electrochemical active surface area (ECSA). The ECSA is an active area of platinum on which a cathodic reaction or an anodic reaction occurs.

According to the present embodiment described above, since the catalyst layer 14 is formed from the catalyst layer support 102 made of the sublimation material, the method is capable of obtaining an independent monolayer catalyst layer 14. As a result, the catalyst layer 14 can be applied to the electrolyte membrane 11 without performing a pressing step, and the membrane electrode assembly 10 that does not depend on a shape of the gas diffusion layer 15 can be manufactured. Thus, a flatness of the catalyst layer 14 can be improved, the electrolyte membrane 11 can be prevented from being damaged, and quality of the membrane electrode assembly 10 can be improved.

In the present embodiment, the catalyst layer 14 is formed on the catalyst layer support 102 in the molten state, and the molten catalyst layer support 102 can permeate into the catalyst layer 14. Thus, the degree of adhesion between the catalyst layer support 102 and the catalyst layer 14 can be improved, and a contact area between the catalyst layer support 102 and the catalyst layer 14 can be increased. As a result, the method is easily capable of obtaining an independent monolayer catalyst layer 14.

When the catalyst layer support 102 is separated from the catalyst layer 14 after bonding the catalyst layer 14 to the electrolyte membrane 11, a degree of adhesion between the electrolyte membrane 11 and the catalyst layer 14 needs to be higher than the degree of adhesion between the catalyst layer 14 and the catalyst layer support 102. On the other hand, in the present embodiment, since the catalyst layer support 102 is made of the sublimation material, and by sublimating the catalyst layer support 102, this prevents the problem associated with separation.

In addition, in the present embodiment, since the catalyst layer 14 is applied to the electrolyte membrane 11 without pressing process, even if the electrolyte membrane 11 is made thin, an occurrence of cross-leakage can be reduced.

Furthermore, in the present embodiment, since the catalyst layer 14 is applied to the electrolyte membrane 11 without pressing process, the ionomer 14*b* added to the catalyst layer 14 can be prevented from permeating into the gas diffusion layer 15. As a result, a deterioration of the gas diffusion performance can be prevented.

Further, if the ionomer 14*b* is dropped onto the catalyst layer 14 while the catalyst layer 14 is bonded to the gas diffusion layer 15, the ionomer 14*b* may permeate the gas diffusion layer 15. Contrary to this, in the present embodiment, since the ionomer 14*b* is dropped onto the catalyst layer 14 while the catalyst layer 14 is not bonded to the gas diffusion layer 15, the method can easily control an amount of ionomer 14*b* dropped.

In the present embodiment, the polybenzimidazole is used as the electrolyte membrane 11. The polybenzimidazole is a material that is difficult to directly form the catalyst layer 14 by spray coating. Contrary to this, according to the method for manufacturing of the present embodiment, the catalyst layer 14 can be easily formed on the electrolyte membrane 11 using the polybenzimidazole.

Other Embodiments

The present disclosure is not limited to the embodiment described hereinabove, but may be modified in various ways as hereinbelow without departing from the gist of the present disclosure. The means disclosed in the individual embodiments may be appropriately combined within a feasible range.

For example, in the above-described embodiment, the ionomer 14*b* is added in the state in which the catalyst layer 14 is formed on the catalyst layer support 102 in step (5), but if the sintering for heating the catalyst layer 14 in step (1) is not performed, a step of adding the ionomer 14*b* to the catalyst layer 14 may be performed before forming the catalyst layer 14 on the catalyst layer support 102.

In addition, in the above-described embodiment, the bonded body consisting of the catalyst layer 14 and the catalyst layer support 102 is placed such that the catalyst layer 14 is between the catalyst layer support 102 and the electrolyte membrane 11. It is noted that, the configuration is not limited to this. The bonded body consisting of the catalyst layer 14 and the catalyst layer support 102 may be placed such that the catalyst layer support 102 is between the catalyst layer 14 and the electrolyte membrane 11.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A method for manufacturing a membrane electrode assembly including a pair of electrodes and an electrolyte membrane interposed between the pair of electrodes, each electrode of the pair of electrodes including a catalyst layer bonded to the electrolyte membrane, and a gas diffusion layer bonded to the catalyst layer, the method comprising:

bonding the catalyst layer and a catalyst layer support made of a sublimation material by placing the catalyst layer support into contact with the catalyst layer;

bonding the electrolyte membrane and the catalyst layer by placing the electrolyte membrane into contact with the catalyst layer bonded to the catalyst layer support; and sublimating the catalyst layer support in a state where the electrolyte membrane is bonded to the catalyst layer, wherein the sublimation material is naphthalene, paradichlorobenzene, or camphor.

2. The method according to claim 1, wherein the catalyst layer support is molten in the bonding of the catalyst layer support and the catalyst layer.

3. The method according to claim 1, wherein the electrolyte membrane is made of polybenzimidazole.

4. The method according to claim 1, wherein the electrolyte membrane includes phosphoric acid, and the phosphoric acid is a proton conductor.

5. A method for manufacturing a membrane electrode assembly including a pair of electrodes and an electrolyte membrane interposed between the pair of electrodes, each electrode of the pair of electrodes including a catalyst layer bonded to the electrolyte membrane, and a gas diffusion layer bonded to the catalyst layer, the method comprising:

bonding the catalyst layer and a catalyst layer support made of a sublimation material by placing the catalyst layer support into contact with the catalyst layer;

bonding the electrolyte membrane and the catalyst layer by placing the electrolyte membrane into contact with the catalyst layer bonded to the catalyst layer support;

sublimating the catalyst layer support in a state where the electrolyte membrane is bonded to the catalyst layer; and adding an ionomer to a surface of the catalyst layer facing away from the catalyst layer support, after the bonding of the catalyst layer and the catalyst layer support, and before the bonding of the electrolyte membrane and the catalyst layer.

* * * * *